(12) United States Patent
Voorhees

(10) Patent No.: US 7,891,603 B2
(45) Date of Patent: Feb. 22, 2011

(54) DIFFERENTIAL THRUST CONTROL SYSTEM

(76) Inventor: Michael Todd Voorhees, 2255 Mariposa Ave., Boulder, CO (US) 80302

( * ) Notice: Subject to any disclaimer, the term of this patent is extended or adjusted under 35 U.S.C. 154(b) by 31 days.

(21) Appl. No.: 12/116,038

(22) Filed: May 6, 2008

(65) Prior Publication Data

US 2009/0127385 A1 May 21, 2009

Related U.S. Application Data

(60) Provisional application No. 60/938,188, filed on May 16, 2007.

(51) Int. Cl.
*B64B 1/30* (2006.01)
*B64B 1/36* (2006.01)

(52) U.S. Cl. .............. 244/29; 244/30; 244/51; 244/55; 244/195

(58) Field of Classification Search .......... 244/25, 244/26, 29, 30, 51, 52, 55, 76 J, 195; 701/99; 703/2, 4
See application file for complete search history.

(56) References Cited

U.S. PATENT DOCUMENTS

| | | | | |
|---|---|---|---|---|
| 1,302,214 A | * | 4/1919 | Porteous | 244/55 |
| 1,817,274 A | * | 8/1931 | Schuette | 244/55 |
| 1,879,345 A | * | 9/1932 | Lawrence | 244/26 |
| 3,070,330 A | * | 12/1962 | Escher | 244/76 J |
| 3,127,132 A | * | 3/1964 | Grady | 244/55 |
| 3,288,397 A | | 11/1966 | Fitzpatrick | |
| 3,492,965 A | * | 2/1970 | Wayfield | 244/52 |
| 3,917,929 A | * | 11/1975 | Reinhart | 701/99 |
| 4,204,656 A | | 5/1980 | Seward | |
| 4,272,042 A | * | 6/1981 | Slater | 244/115 |
| 4,402,475 A | | 9/1983 | Pavlecka | |
| 4,591,112 A | | 5/1986 | Piasecki | |
| 4,606,515 A | | 8/1986 | Hickey | |
| 5,330,131 A | * | 7/1994 | Burcham et al. | 244/51 |
| 5,368,256 A | | 11/1994 | Kalisz | |
| 5,449,129 A | | 9/1995 | Carlile et al. | |
| 6,196,499 B1 | * | 3/2001 | Kahler | 244/195 |
| 6,260,796 B1 | * | 7/2001 | Klingensmith | 244/195 |
| 7,093,789 B2 | | 8/2006 | Barocela et al. | |
| 2005/0258305 A1 | | 11/2005 | Piers et al. | |
| 2007/0023581 A1 | | 2/2007 | La | |

OTHER PUBLICATIONS

Durand, W.F., Aerodynamic Theory, 1934, Julius Springer, Berlin, Germany.

* cited by examiner

*Primary Examiner*—Galen Barefoot

(57) ABSTRACT

A system allowing for the controlled propulsion of aircraft, especially buoyant and semi-buoyant airships designed as a symmetric body of revolution, without the need for or use of aerodynamic control surfaces, comprised of a plurality of ducted fan thrusters placed both fore and aft, designed to ingest air flowing at less than free stream velocity. Fans are arranged such that when at standard orientation, the thrust from each is directed tangentially to an arc drawn along the hull from bow to stem. By defining multiple sets of thrusters based upon their location, differential thrust may be applied based upon set membership in order to affect translational and rotational maneuvering of the aircraft.

13 Claims, 2 Drawing Sheets

DIFFERENTIAL THRUST CONTROL SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to manned and unmanned airships and other buoyant and semi-buoyant vehicles, and more particularly relates to the use of multiple fans to provide differential thrust for the controlled maneuver thereof.

2. Description of the Related Art

Historically, airships were only practically rendered steerable, a.k.a. dirigible, with the introduction of proportionately large aerodynamic control surfaces. Most often taking the form of tailfins, thus providing an inherent stabilizing force to the flight path, such control surfaces were effective to maneuver airships provided that sufficient airspeed was attained and the presence of cross winds or vertical drafts were limited. However at slow speeds, the maneuverability attained by this method was severely degraded, and the control surfaces became a significant liability in the presence of strong winds perpendicular to the long axis of the airship. Furthermore, according to Durand, tail fins often accounted for between 18.4% and 26.4% of the combined drag forces of the hull and tail fins on conventional rigid airships. While many modern airships, including proposed and actualized rigid, semi-rigid, and non-rigid types use vectorable thrusters of both ducted fan and unshrouded propeller types, these are generally used in conjunction with tail fins. Furthermore, the means to pivot the vectorable thrusters incurs penalties in terms of weight, cost, and complexity. Pavlecka informs us of the benefits to be gained from eliminating tail fins from airship design and proposes the use of internally ducted, stationary bow and stern thrusters for both directional control and lift augmentation purposes. However, as the thrusters of his design are always arranged orthogonally to the axis of the airship extending from bow to stern, they are not capable of contributing to the airship's forward momentum, and must always serve in conjunction with other prime movers to achieve forward progress or maneuvers with a forward component.

BRIEF SUMMARY OF THE INVENTION

By utilizing the natural direction of flow around an aircraft in forward flight, the present invention positions a plurality of fans oriented such that all fans, when engaged equally in the forward thrust setting, contribute to the aircraft's progress in forward flight, and by continuously adjusting the thrust from each fan, dynamic stability may be achieved. Yet when discrete sets of fans are operated at differing levels of power and in differing thrust modes (forward or reverse), the combined effect results in the ability to perform numerous rotational and translational maneuvers of the aircraft. When the fans are comprised of controllable pitch propellers and variable speed electric motors (prior art technologies long established and well understood), the thrust force and direction can be adjusted rapidly. Such an arrangement of adjustable and reversible fans can provide all means of propulsion and maneuver for the aircraft and can also be used in conjunction with main forward thrusters.

BRIEF DESCRIPTION OF THE SEVERAL VIEWS OF THE DRAWINGS

FIG. 1 illustrates a Differential Thrust Control System of the present invention. Like numerals identify identical items throughout the figures.

DETAILED DESCRIPTION OF THE INVENTION

Figure 1A:
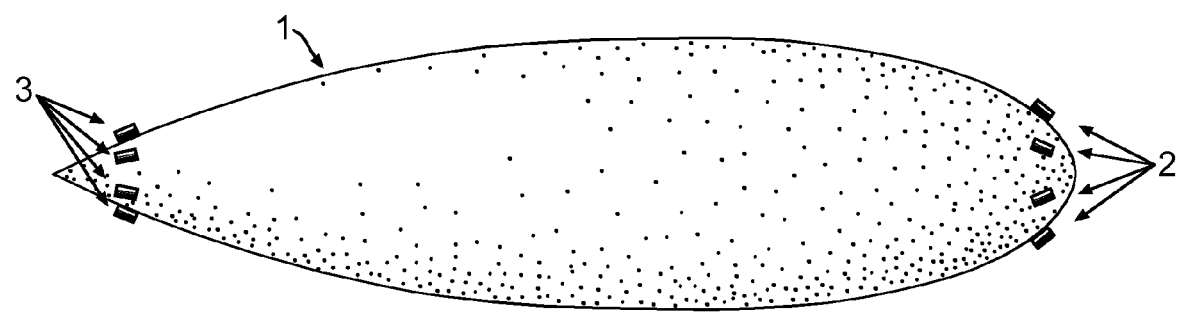
FIG. 1a shows the external perspective view of the starboard side of an airship 1 with the Differential Thrust Control System forward fans 2 and aft fans 3 as positioned on its hull.
Figure 1B:
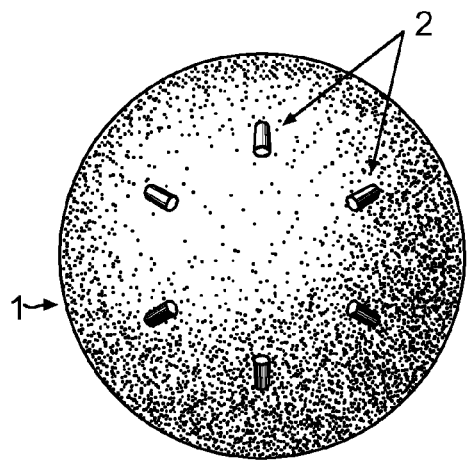
FIG. 1b shows the bow of the airship 1, with the forward fans 2 visible.
Figure 1C:
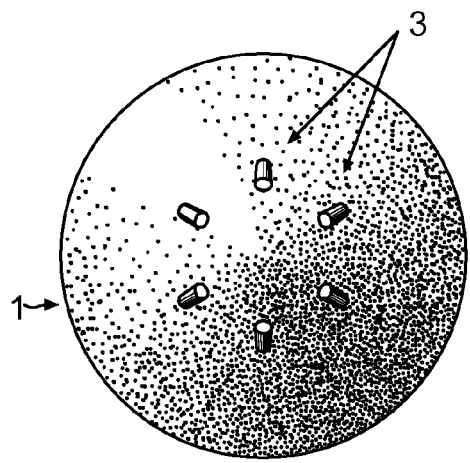
FIG. 1c shows the stern view of the airship 1, with the aft fans 3 visible.

Referencing FIGS. 1a, 1b, and 1c, this invention is a system allowing for the controlled propulsion of buoyant and semi-buoyant aircraft, especially airships designed as a symmetric body of revolution, without the need for or use of aerodynamic control surfaces, comprised of an airship 1, and a plurality of ducted fan thrusters 2 & 3 placed both fore and aft respectively, designed to ingest air flowing at less than free stream velocity. Fans are arranged such that the thrust from each is directed tangentially to an arc drawn along the hull from bow to stern. Symmetrically arranged sets of thrusters both fore and aft, such as six placed at positions on a circle circumscribed around the hull at positions spaced at 0°, 60°, 120°, 180°, 240°, and 300° may be used. When engaged equally in the forward setting, fans collectively provide thrust that propels the airship in a forward motion. However, by defining multiple sets of thrusters based upon their location, differential thrust may be applied based upon set membership in order to affect translational and rotational maneuvering of the aircraft. Membership of a fan in various sets may be weighted based upon the vector components of its thrust based upon its orientation and position on the airship.

Each thruster's membership is defined relative to the following sets: fore or aft, port or starboard, upper or lower. Using twelve thrusters as an example, six thrusters 2 are placed fore and six thrusters 3 are placed aft, arranged symmetrically in a circular pattern spaced evenly at intervals of 60°, including fans occupying both the zenith and nadir positions. Nomenclature for this arrangement of thrusters may be used as follows:

Upper Port Fore Thruster (UPF), Upper Fore Thruster (UF), Upper Starboard Fore Thruster (USF)

Lower Port Fore Thruster (LPF), Lower Fore thruster (LF), Lower Starboard Fore Thruster (LSF)

Upper Port Aft Thruster (UPA), Upper Aft Thruster (UA), Upper Starboard Aft Thruster (USA)
Lower Port Aft Thruster (LPA), Lower Aft thruster (LA), Lower Starboard Aft Thruster (LSA)
Basic maneuvers are as follows:
Forward Level Hold Altitude: All Forward
Reverse Level Hold Altitude: All Reverse To affect the following specific maneuvers the following combinations of thrusters are instructed to produce more thrust than the other thrusters:
Forward Level Ascension: LPF, LF, LSF, UPA, UA, USA
Forward Level Descension: UPF, UF, USF, LPA, LA, LSA
Forward Port Turn: USF, LSF, USA, LSA
Forward Starboard Turn: UPF, LPF, UPA, LPA
Forward Pitch Up: LPF, LF, LSF, LPA, LA, LSA
Forward Pitch Down: UPF, UF, USF, UPA, UA, USA
Forward with Port Lateral Drift: USF, LSF, UPA, LPA
Forward with Starboard Lateral Drift: UPF, LPF, USA, LSA To affect the following specific maneuvers one set of thrusters is commanded to forward thrust with the other set commanded to reverse thrust:
Pivot Bow to Port: Forward—USF, LSF, USA, LSA; Reverse—UPF, LPF, UPA, LPA
Pivot Bow to Starboard: Forward—UPF, LPF, UPA, LPA; Reverse—USF, LSF, USA, LSA
Lateral Shift to Port: Forward—USF, LSF, UPA, LPA; Reverse—UPF, LPF, USA, LSA
Lateral Shift to Starboard: Forward—UPF, LPF, USA, LSA; Reverse—USF, LSF, UPA, LPA
Level Ascension Forward—LPF, LF, LSF, UPA, UA, USA; Reverse—UPF, UF, USF, LPA, LA, LSA
Level Descension Forward—UPF, UF, USF, LPA, LA, LSA; Reverse—LPF, LF, LSF, UPA, UA, USA
Level Ascension Pivot Bow to Port: Forward—LSF, LF, USF, USA, UA, LSA; Reverse—UPF, UF, LPF, UPA, LA, LPA
Level Ascension Pivot Bow to Starboard: Forward—LPF, LF, UPF, UPA, UA, LPA; Reverse—USF, UF, LSF, USA, LA, LSA
Level Descension Pivot Bow to Port: Forward—LSF, UF, USF, USA, LA, LSA; Reverse—UPF, LF, LPF, UPA, UA, LPA
Level Descension Pivot Bow to Starboard: Forward—LPF, UF, UPF, UPA, LA, LPA; Reverse—USF, LF, LSF, USA, UA, LSA If individual fans are inoperable, modified sets and power weightings may be employed to compensate for the lack of the inoperable fan's contributing thrust.

Figure 2:
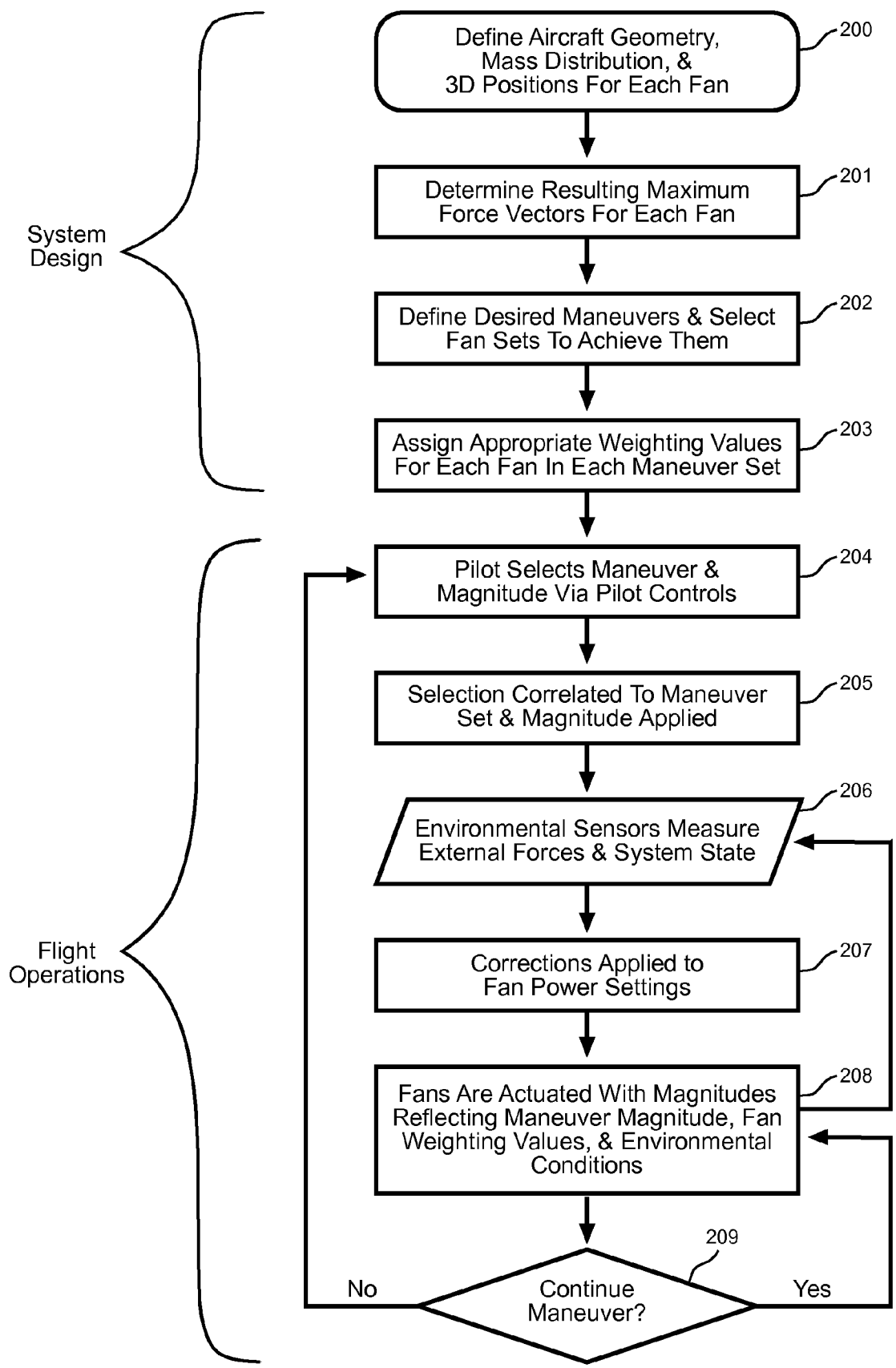
FIG. 2 depicts a flow chart illustrating the steps involved in designing and operating the Differential Thrust Control System of the present invention.

To further illustrate how to achieve proper design and operation of the invention, let us reference FIG. 2, a flowchart of the system design and operation. In step 200, the designer defines the aircraft geometry and mass distribution. One may additionally perform fluid dynamics modeling to determine regions of slower velocity of air near the hull to optimize placement of fans for propulsive efficiency. Based upon this information, the location and orientation of the fans is performed. In step 201, the maximum force vectors are determined for each fan. Step 202 is the creation of a list of desired maneuvers for the aircraft, and the selection of fan sets that may be employed to achieve them. Step 203 is the assignment of appropriate weighting values for each fan in a maneuver set, such as forward, reverse and percent of max power. This process may optionally be validated using computerized modeling and simulation. In step 204, the pilot selects what maneuver and magnitude thereof is desired for the flight path of the aircraft using the pilot controls. In step 205, a central processing unit correlates the pilot's choice to the stored data regarding the maneuver, associated fan sets, and weighting values. The central processing unit applies a preliminary command value for all fans involved. Step 206 takes data supplied by a set of sensors measuring airspeed, gusts and pressure readings, temperature and solar loads at different points on the aircraft, and accelerations on the bow and stern, and translates these into force loads on the aircraft. These values are used in step 207 to adjust the preliminary command values, if necessary, in order to achieve accurate maneuvering corresponding to the pilot's choice. The resulting adjusted command values are then sent in step 208 to the fans causing them to operate correspondingly. The continuous or periodic input of the environmental sensors provides feedback to the system allowing for ongoing adjustment to the fan values. Step 209 represents the pilot's ongoing decisions. As long as the pilot maintains the maneuver selection, the fans continue as commanded, subject to the adjustment based upon the environmental sensor feedback. If the pilot chooses a different maneuver, then the system returns to step 204 and repeats the process.

REFERENCES CITED

U.S. Patent Documents
U.S. Pat. No. 4,402,477 September 1983 Pavlecka 244/96; 244/52; 244/69; 244/29; 416/128; 440/40

OTHER PUBLICATIONS

Durand, W. F. (ed.) 1934, Aerodynamic Theory, Berlin: Julius Springer.

What I claim as my invention is:

1. A propulsion system for the controlled flight of buoyant and semi-buoyant aircraft comprising:
   a plurality of fans arranged such that each fan is positioned to ingest air moving at slower than the free stream velocity, such as near the bow and stern on an airship with a predominately symmetrical body of revolution hull shape;
   orientations such that each of the fan's thrust is directed along a line tangent to an arc drawn from bow to stern whereby the air stream produced by fans at the bow when in the forward thrust setting travels in a divergent path outwardly around the hull, and the air stream produced by fans at the stern when in the forward thrust setting travels in a convergent path inwardly toward the tapered end of the hull;
   a system of classification of sets of fans used to affect specific rotational and translational maneuvers;
   a weighting system assigned to govern the relative power of each fan in a set used to affect maneuver based upon each fan's direction and maximum power of thrust, as well as its position relative to the vehicle's centers of mass, buoyancy, and dynamic lift;
   and a control system translating the pilot's actions into the appropriate selection of fan set and engagement of fans at the proper level to affect desired maneuver.

2. A propulsion system of claim 1 wherein the fans are ducted fans.

3. A propulsion system of claim 1 wherein the fans are ducted fans and whereby the external surface structure of the ducts is a continuous surface forming a raised extension of the hull.

4. A propulsion system of claim 1 wherein the fans are powered by electric motors.

5. A propulsion system of claim 1 wherein the fans are powered by internal combustion motors.

6. A propulsion system of claim 1 wherein the system is used on a rigid airship.

7. A propulsion system of claim 1 wherein the system is used on a semi-rigid airship.

8. A propulsion system of claim 1 wherein the system is used on a non-rigid airship.

9. A propulsion system of claim 1 wherein the system is used on a hybrid aerodynamic/aerostatic aircraft.

10. A propulsion system of claim 1 wherein the fans are capable of operating independently in both forward and reverse thrust modes.

11. A propulsion system of claim 1 wherein the forward and aft fans are substantially identical in thrust capabilities.

12. A propulsion system of claim 1 wherein the forward and aft fans are of different thrust capabilities.

13. A propulsion system of claim 1 wherein the fan commands are adjusted to compensate for external forces acting upon the aircraft based upon the inputs of various environmental sensors.

* * * * *